(12) United States Patent
Horii

(10) Patent No.: US 12,032,632 B2
(45) Date of Patent: Jul. 9, 2024

(54) DFS-BASED CYCLE DETECTION ON PREGEL MODEL

(71) Applicant: INTERNATIONAL BUSINESS MACHINES CORPORATION, Armonk, NY (US)

(72) Inventor: Hiroshi Horii, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 384 days.

(21) Appl. No.: 17/100,078

(22) Filed: Nov. 20, 2020

(65) Prior Publication Data

US 2022/0164388 A1 May 26, 2022

(51) Int. Cl.
*G06F 16/00* (2019.01)
*G06F 16/22* (2019.01)
*G06F 16/901* (2019.01)
*G06F 16/903* (2019.01)

(52) U.S. Cl.
CPC ...... *G06F 16/9024* (2019.01); *G06F 16/2237* (2019.01); *G06F 16/90339* (2019.01)

(58) Field of Classification Search
CPC ............. G06F 16/9024; G06F 16/2237; G06F 16/90339
See application file for complete search history.

(56) References Cited

U.S. PATENT DOCUMENTS

| 2011/0004581 A1 | 1/2011 | Schmidt et al. | |
| 2014/0143110 A1 | 5/2014 | Qin et al. | |
| 2015/0067695 A1* | 3/2015 | Hamamoto | G06F 9/5066 |
| | | | 718/104 |

(Continued)

FOREIGN PATENT DOCUMENTS

| CN | 109241355 A | 1/2019 |
| CN | 109284888 A | 1/2019 |
| CN | 111859027 A | 10/2020 |

OTHER PUBLICATIONS

NPL1, https://web.archive.org/web/20171017120943/https://www.geeksforgeeks.org/cycles-of-length-n-in-an-undirected-and-connected-graph, Oct. 18, 2017 (Year: 2018).*

(Continued)

*Primary Examiner* — Alex Gofman
*Assistant Examiner* — Suman Rajaputra
(74) *Attorney, Agent, or Firm* — Tutunjian & Bitetto, P.C.; Robert Richard Aragona

(57) ABSTRACT

A method, system and computer program product are presented for reducing memory consumption in depth first search (DFS)-based cycle detection processes to detect an n-length cycle on a Pregel model. The method includes generating a graph including a plurality of vertices and edges connecting the plurality of vertices, commencing a cycle from a first vertex of the plurality of vertices, setting an ID of the first vertex to a path and the first vertex as a target vertex, and iterating the following n−1 times: send the path to out-edges starting from the first vertex and transferring the path, via out-edges, n−1 times by subsequent received vertices, find one vertex before returning to the target vertex, add an ID of a found vertex to the path, and set the found vertex as the target vertex such that n=n−1, where is a number of iterations.

20 Claims, 13 Drawing Sheets

(56) References Cited

U.S. PATENT DOCUMENTS

| | | | |
|---|---|---|---|
| 2015/0161622 A1* | 6/2015 | Hoffmann | H04L 63/20 705/318 |
| 2016/0335322 A1 | 11/2016 | Then et al. | |
| 2017/0060958 A1* | 3/2017 | Van Rest | G06F 16/9024 |
| 2018/0039710 A1* | 2/2018 | Chen | G06F 16/9024 |
| 2019/0317963 A1* | 10/2019 | Erler | G06F 16/902 |
| 2022/0043675 A1 | 2/2022 | Xia et al. | |

OTHER PUBLICATIONS

NPL2, https://math.stackexchange.com/questions/1029073/a-cycle-in-an-undirected-graph (Year: 2014).* https://web.archive.org/web/20171017120943/https://www.geeksforgeeks.org/cycles-of-length-n-in-an-undirected-and-connected-graph/) dated Oct. 18, 2017 (Year: 2018).*

Grzegorz Malewicz, https://dl.acm.org/doi/pdf/10.1145/1807167.1807184) SIGMOD '10: Proceedings of the 2010 ACM SIGMOD International Conference on Management of data Jun. 6, 2010 pp. 135-146 https://doi.org/10.1145/1807167.1807184 dated Jun. 6, 2010. (Year: 2010).* https://math.stackexchange.com/questions/1029073/a-cycle-in-an-undirected-graph (Year: 2014).* https://Aweb.archive.org/web/20171017120943/https:/Avww.geeksforgeeks.org/cycles-of-length-n-in-an-undirected-and-connected-graph/) dated Oct. 18, 2017 (Year: 2018) (Year: 2018).*

Grzegorz Malewicz, https://dl.acm.org/doi/pdf/10.1145/1807167.1807184) SIGMOD. Proceedings of the 2010 ACM SIGMOD International Conference on Management of data Jun. 6, 2010 pp. 135-146 https://doi.org/10.1145/1807167.1807184 dated Jun. 6, 2010. (Year: 2010) (Year: 2010).* https://math.stackexchange.com/questions/1029073/a-cycle-in-an-undirected-graph (Year: 2014) (Year: 2014).*

Fraigniaud et al., "Distributed Detection of Cycles", arXiv:1706.03992v1 [cs.DC]. Jun. 13, 2017. pp. 1-19.

Li et al., "TGP: Mining Top-K Frequent Closed Graph Pattern without Minimum Support", International Conference on Advanced Data Mining and Applications held on Nov. 19, 2010. Downloaded May 23, 2014. pp. 1-13.

Mehta et al., "A Graph Theoretical Approach for Identifying Fraudulent Transactions in Circular Trading", The Sixth International Conference of Data Analytics. Nov. 12-16, 2017. pp. 28-33.

Mell et al., "The NIST Definition of Cloud Computing", National Institute of Standards and Technology, Special Publication 800-145. Sep. 2011, pp. 1-7.

Qiu et al., "Real-time Constrained Cycle Detection in Large Dynamic Graphs", Proceedings of the VLDB Endowment. Aug. 1, 2019. vol. 11, No. 12. pp. 1876-1888.

Suzumura et al., "Towards Federated Graph Learning for Collaborative Financial Crimes Detection", arXiv:1909.1294v2 [cs.CY]. Oct. 2, 2019. pp. 1-10.

Xu et al., "Mining Minimal Constrained Flow Cycles from Complex Transaction Data", Procedures of the the 8th Australasian Data Mining Conference held Dec. 1-4, 2009. pp. 151-158.

International Search Report issued in corresponding PCT Application Serial No. PCT/IB2021/059721 dated Jan. 26, 2022 (10 pgs).

* cited by examiner

DFS-BASED CYCLE DETECTION ON PREGEL MODEL

BACKGROUND

The present invention relates generally to cycle detection in a directed graph, and more specifically, to depth first search (DFS)-based cycle detection on the Pregel model.

Many practical computing problems concern large graphs. Standard examples include the Web graph and various social networks. The scale of these graphs, in some cases billions of vertices, trillions of edges, poses challenges to their efficient processing. Graph algorithms often exhibit poor locality of memory access, very little work per vertex, and a changing degree of parallelism over the course of execution. Distribution over many machines exacerbates the locality issue, and increases the probability that a machine will fail during computation.

SUMMARY

In accordance with an embodiment, a method is provided for reducing memory consumption in depth first search (DFS)-based cycle detection processes to detect an n-length cycle on a Pregel model. The method includes generating a graph including a plurality of vertices and edges connecting the plurality of vertices, commencing a cycle from a first vertex of the plurality of vertices, setting an ID of the first vertex to a path and the first vertex as a target vertex, and iterating the following n−1 times: send the path to out-edges starting from the first vertex and transferring the path, via out-edges, n−1 times by subsequent received vertices, find one vertex before returning to the target vertex, add an ID of a found vertex to the path, and set the found vertex as the target vertex such that n=n−1, where n is a number of iterations.

In accordance with another embodiment, a method is provided for reducing memory consumption in cycle detection processes. The method includes employing a depth first search (DFS) approach to detect an n-length cycle on a Pregel model by generating a graph including a plurality of vertices and edges connecting the plurality of vertices, commencing a cycle from a first vertex of the plurality of vertices, setting an ID of the first vertex to a path and the first vertex as a target vertex, and iterating a DFS process n−1 times, where n is a number of iterations.

A computer program product for reducing memory consumption in depth first search (DFS)-based cycle detection processes to detect an n-length cycle on a Pregel model is presented, the computer program product comprising a computer readable storage medium having program instructions embodied therewith, the program instructions executable by a computer to cause the computer to generate a graph including a plurality of vertices and edges connecting the plurality of vertices, commence a cycle from a first vertex of the plurality of vertices, set an ID of the first vertex to a path and the first vertex as a target vertex, and iterate the following n−1 times: send the path to out-edges starting from the first vertex and transferring the path, via out-edges, n−1 times by subsequent received vertices, find one vertex before returning to the target vertex, add an ID of a found vertex to the path, and set the found vertex as the target vertex such that n=n−1, where n is a number of iterations.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

DETAILED DESCRIPTION

Figure 1:
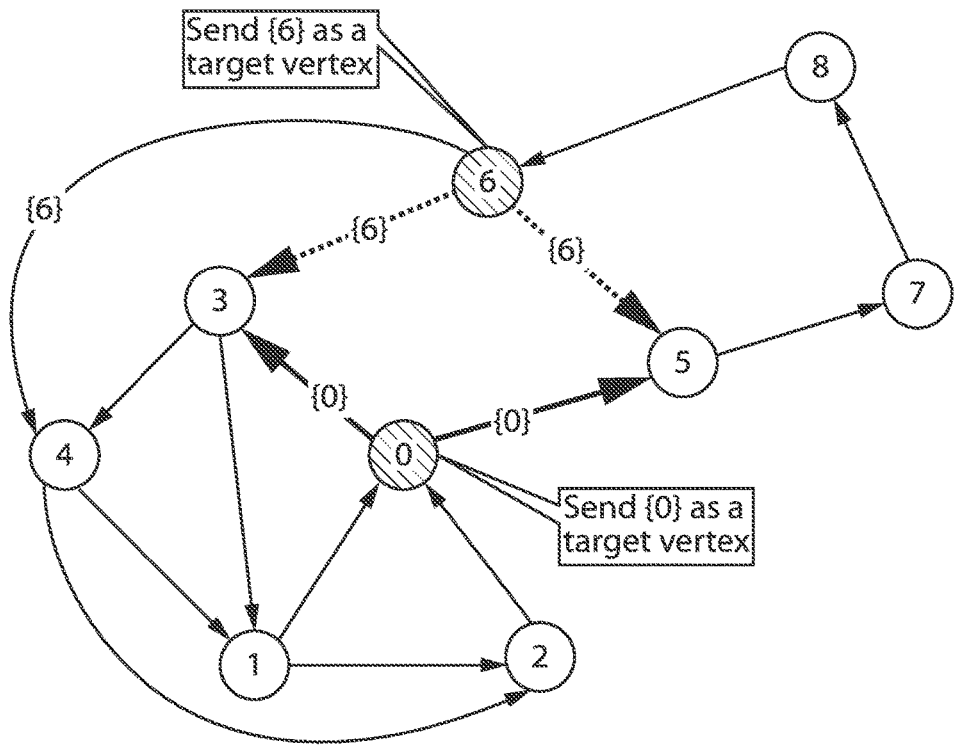
FIG. 1 is an exemplary directed graph where all the 4-length cycles that include vertex 0 and vertex 6 are detected, in a first iteration, in accordance with an embodiment of the present invention.

Exemplary embodiments in accordance with the present invention provide for depth first search (DFS)-based cycle detection on the Pregel model. Graph learning is defined as a type of machine learning that utilizes graph-based features to add richer context to data by first linking that data together as a graph structure, and then deriving features from different metrics on the graph. Various graph features can be defined by exploiting a set of graph analytics such as connectivity, centrality, community detection, pattern matching. Graph features can also be combined with non-graph features (e.g., features on attributes for a specific data point). Once a set of features including graph features and non-graph features are defined, a problem can then be formulated as a supervised machine learning problem (assuming that label data is provided). However, if label data is not provided, it would be an unsupervised machine learning problem so that the methods can apply, e.g., clustering or outlier detection.

Nevertheless, to address distributed processing of large scale graphs, the Pregel model was built as a scalable and fault-tolerant platform with an application programming interface (API) that is sufficiently flexible to express arbitrary graph algorithms. The Pregel model is a programming model that implements the bulk synchronous parallel for graph analytics.

The high-level organization of Pregel programs is inspired by Valiant's Bulk Synchronous Parallel model. Pregel computations include a sequence of iterations, called supersteps. During a superstep the framework invokes a user-defined function for each vertex, conceptually in parallel. The function specifies behavior at a single vertex V and a single superstep S. It can read messages sent to V in superstep S−1, send messages to other vertices that will be received at superstep S+1, and modify the state of V and its outgoing edges. Messages are usually sent along outgoing edges, but a message can be sent to any vertex whose identifier is known.

The vertex-centric approach is reminiscent of MapReduce in that users focus on a local action, processing each item independently, and the system composes these actions to lift computation to a large dataset. By design the model is well-suited for distributed implementations, that is, the model doesn't expose any mechanism for detecting order of execution within a superstep, and all communication is from superstep S to superstep S+1.

The synchronicity of this model makes it easier to reason about program semantics when implementing algorithms, and ensures that Pregel programs are inherently free of deadlocks and data races common in asynchronous systems. In principle, the performance of Pregel programs should be competitive with that of asynchronous systems given enough parallel slack. Because graph computations have many more vertices than machines, a user should be able to balance the machine loads so that the synchronization between supersteps does not add excessive latency.

The Pregel model employs a breadth firth search (BFS)-approach. BFS is an algorithm for traversing or searching tree or graph data structures. BFS starts at a tree root (or some arbitrary node of a graph, sometimes referred to as a "search key"), and explores all of the neighbor nodes at the present depth prior to moving on to the nodes at the next depth level. However, existing algorithms of cycle detection on the Pregel model need many messages because such algorithms employ a BFS-approach. In other words, total sizes of messages are increased exponentially based on numbers of iterations. As a result, though the Pregel model provides ease-of development with parallelization, existing algorithms of cycle detection on the Pregel model need too many messages because of the use of BFS.

The exemplary embodiments of the present invention disclose methods and systems that alleviate such issues by employing a depth first search (DFS)-approach. DFS is an algorithm for traversing or searching tree or graph data structures. The algorithm starts at a root node (selecting some arbitrary node as the root node in the case of a graph) and explores as far as possible along each branch before backtracking. Thus, employing a DFS-approach significantly reduces the number of messages for each iteration in detecting cycles.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this invention.

FIG. 1 is an exemplary directed graph where all the 4-length cycles that include vertex 0 and vertex 6 are detected, in a first iteration, in accordance with an embodiment of the present invention.

The input to a Pregel computation is a directed graph in which each vertex is uniquely identified by a string vertex identifier. Each vertex is associated with a modifiable, user defined value. The directed edges are associated with their source vertices, and each edge includes a modifiable, user-defined value and a target vertex identifier. A Pregel computation includes input, when the graph is initialized, followed by a sequence of supersteps separated by global synchronization points until the algorithm terminates, and finishes with output.

Within each superstep the vertices compute in parallel, each executing the same user-defined function that expresses the logic of a given algorithm. A vertex can modify its state or that of its outgoing edges, receive messages sent to it in the previous superstep, send messages to other vertices (to be received in the next superstep), or even mutate the topology of the graph. Edges are not first-class citizens in this model, having no associated computation.

Algorithm termination is based on every vertex voting to halt. In superstep 0, every vertex is in the active state and all active vertices participate in the computation of any given superstep. A vertex deactivates itself by voting to halt. This means that the vertex has no further work to do unless triggered externally, and the Pregel framework will not execute that vertex in subsequent supersteps unless it receives a message. If reactivated by a message, a vertex must explicitly deactivate itself again. The algorithm as a whole terminates when all vertices are simultaneously inactive and there are no messages in transit.

The output of a Pregel program is the set of values explicitly output by the vertices. It is often a directed graph isomorphic to the input, but this is not a necessary property of the system because vertices and edges can be added and removed during computation. A clustering algorithm, for example, might generate a small set of disconnected vertices selected from a large graph. A graph mining algorithm might simply output aggregated statistics mined from the graph.

Vertices communicate directly with one another by sending messages, each of which includes a message value and the name of the destination vertex. The type of the message value is specified by the user as a template parameter of the Vertex class.

A vertex can send any number of messages in a superstep. All messages sent to vertex V in superstep S are available, via an iterator, when V's Compute( ) method is called in superstep S+1. There is no guaranteed order of messages in the iterator, but it is guaranteed that messages will be delivered and that they will not be duplicated.

Pregel aggregators are a mechanism for global communication, monitoring, and data. Each vertex can provide a value to an aggregator in superstep S, the system combines those values using a reduction operator, and the resulting value is made available to all vertices in superstep S+1. The Pregel model includes a number of predefined aggregators, such as min, max, or sum operations on various integer or string types.

There are many possible file formats for graphs, such as a text file, a set of vertices in a relational database, or rows in a table. To avoid imposing a specific choice of file format, the Pregel model decouples the task of interpreting an input file as a graph from the task of graph computation. Similarly, output can be generated in an arbitrary format and stored in the form most suitable for a given application. The Pregel library provides readers and writers with many common file formats. The Pregel library divides a graph into partitions, each including a set of vertices and all of those vertices' outgoing edges. Assignment of a vertex to a partition depends solely on the vertex ID, which implies it is possible to know which partition a given vertex belongs to even if the vertex is owned by a different machine, or even if the vertex does not yet exist.

In FIG. 1, by employing the DFS-approach, there are 5 messages or 5 IDs that are sent by vertices 0 and 6.

In particular, the ID {6} is sent through edges from vertex 6 to 4, from 6 to 3, and from 6 to 5.

The ID {0} is sent via edges from vertex 0 to 3, and from 0 to 5.

Therefore, the first iteration includes 5 messages with 5 IDs.

Target vertices (0 and 6) send their own IDs ({0}, {6}) to their neighbor out-edges.

It is noted, with respect to FIGS. 1-4, that with k iterations, candidates of the last edges in cycles are identified by only redirecting received IDs. With the k-th iteration, the identified edges are informed to the target vertices.

Figure 2:
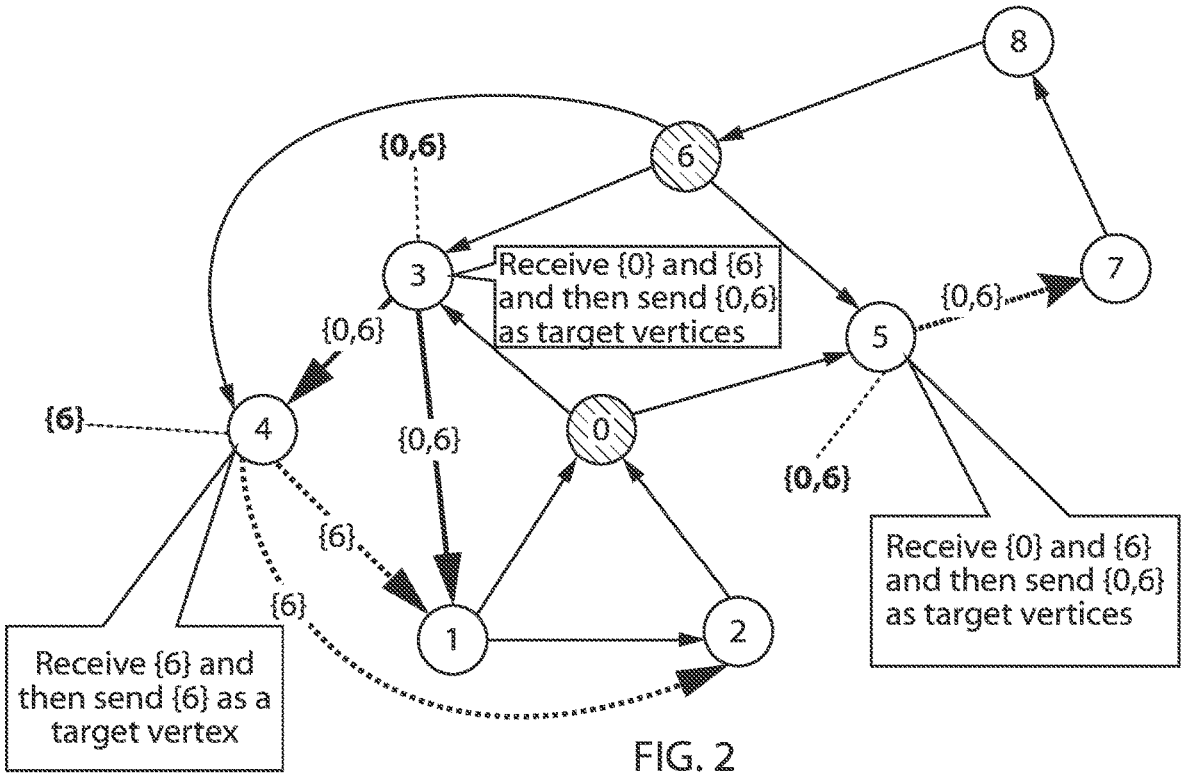
FIG. 2 is the exemplary directed graph of FIG. 1 where a second iteration takes place to detect the IDs, in accordance with an embodiment of the present invention.

FIG. 2 is the exemplary directed graph of FIG. 1 where a second iteration takes place to detect the IDs, in accordance with an embodiment of the present invention.

By employing the DFS-approach, there are 5 messages with 8 IDs that are sent by vertices 0 and 6.

In particular, the ID {6} is sent through edges from vertex 3 to 1, from 3 to 4, from 4 to 1, 4 to 2, and from 5 to 7.

The ID {0} is sent through edges from vertex 3 to 1, from 3 to 4, and from 5 to 7.

Therefore, the second iteration includes 5 messages with 8 IDs.

Received vertices (3, 4, and 5) send received IDs to their neighbor out-edges.

Figure 3:
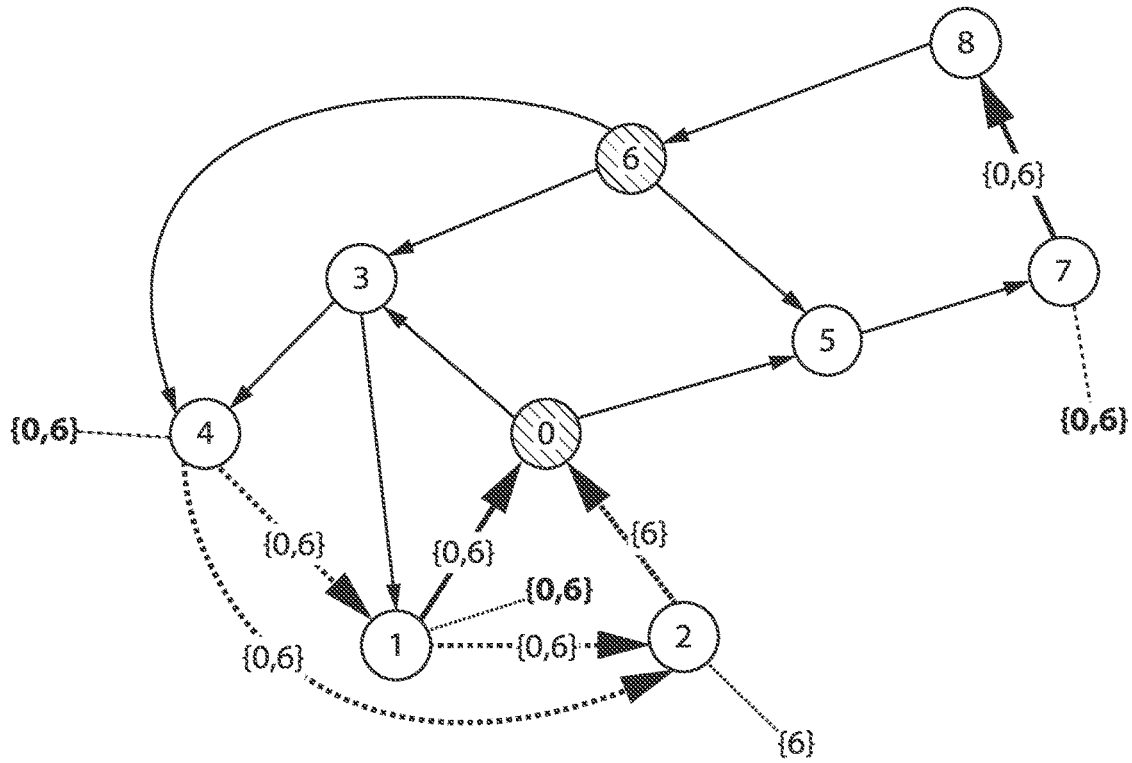
FIG. 3 is the exemplary directed graph of FIG. 2 where a third iteration takes place to detect the IDs, in accordance with an embodiment of the present invention.

FIG. 3 is the exemplary directed graph of FIG. 2 where a third iteration takes place to detect the IDs, in accordance with an embodiment of the present invention.

By employing the DFS-approach, there are 6 messages with 11 IDs that are sent by vertices 0 and 6.

In particular, the ID {6} is sent through edges from vertex 1 to 0, from 1 to 2, from 2 to 0, from 4 to 1, from 4 to 2, and from 7 to 8.

The ID {0} is sent through edges from vertex 1 to 0, from 1 to 2, from 4 to 1, from 4 to 2, and from 7 to 8.

Therefore, the third iteration includes 6 messages with 11 IDs.

Received vertices (0, 1, 2, 4, and 8) send received IDs to their neighbor target out-edges excepting vertex 0. Vertex 0 ignores received {0} because vertex 0 is not included twice in a cycle. In addition, vertex 0 ignores {6} because vertex 0 and 6 are target vertices. To avoid duplication of detected cycles, a higher ID is not redirected in a target vertex.

Figure 4:
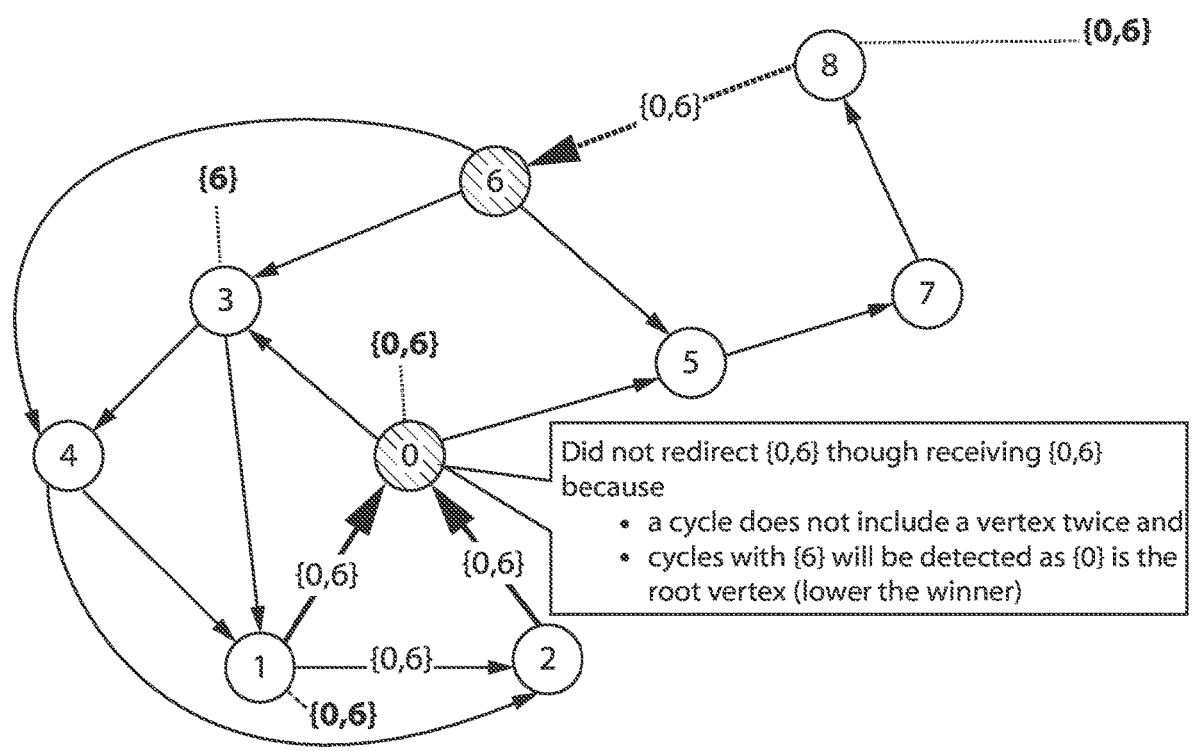
FIG. 4 is the exemplary directed graph of FIG. 3 where a fourth iteration takes place to detect the IDs, in accordance with an embodiment of the present invention.

FIG. 4 is the exemplary directed graph of FIG. 3 where a fourth iteration takes place to detect the IDs, in accordance with an embodiment of the present invention.

By employing the DFS-approach, there are 6 messages with 6 IDs that are sent by vertices 0 and 6.

In particular, the ID {6} is sent through edges from vertex 1 to 0, from 1 to 2, from 2 to 0, and from 8 to 6.

The ID {0} is sent through edges from vertex 1 to 0, from 1 to 2, from 2 to 0, and from 8 to 6.

Therefore, the fourth iteration includes 8 messages with 8 IDs.

It is noticed that, received target vertices (0 and 6) identify candidates of the last edges in cycles. For example, vertex 0 knows edges from 1 to 0 (0<-1) and from 2 to 0 (0<-2) may be last edges in one or more cycles, and vertex 6 knows an edge from 8 to 6 (6<-8) may be last edges in one of more cycles. To identify the next edges of the cycles with the next k iterations (from 5 to 8), vertices 0 and 6 send identified these edges to their neighbor out-edges.

Figure 5:
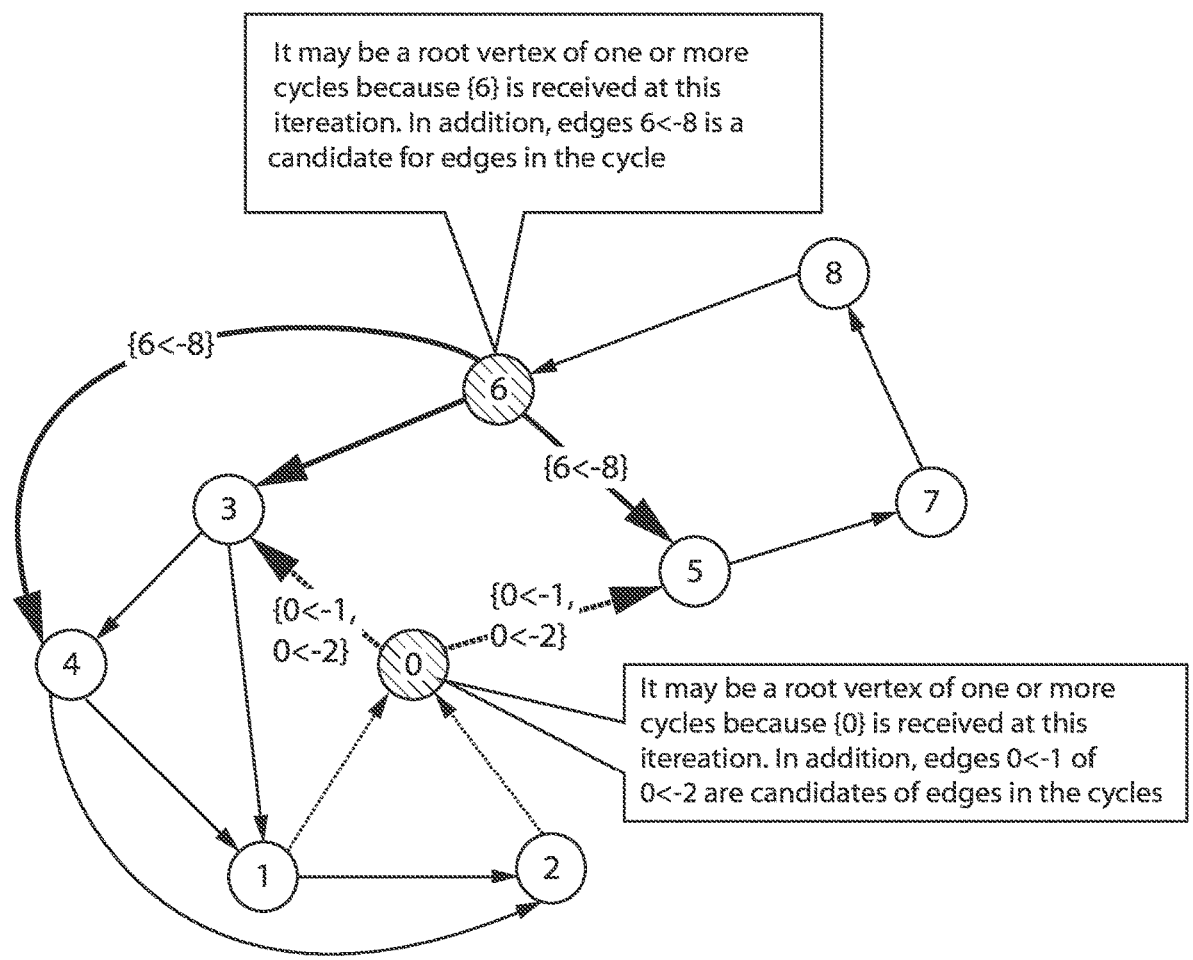
FIG. 5 is the exemplary directed graph of FIG. 4 where a fifth iteration takes place to detect the IDs, in accordance with an embodiment of the present invention.

FIG. 5 is the exemplary directed graph of FIG. 4 where a fifth iteration takes place to detect the IDs, in accordance with an embodiment of the present invention.

By employing the DFS-approach, there are 4 messages with 12 IDs that are sent by vertices 0 and 6.

In particular, the edge {6<-8} is sent through edges from vertex 6 to 3, 6 to 4, and from 6 to 5.

The two edges {0<-1, 0<-2} are sent through edges from vertex 0 to 3 and from 6 to 5.

Therefore, the fifth iteration includes 4 messages with 12 IDs.

Figure 6:
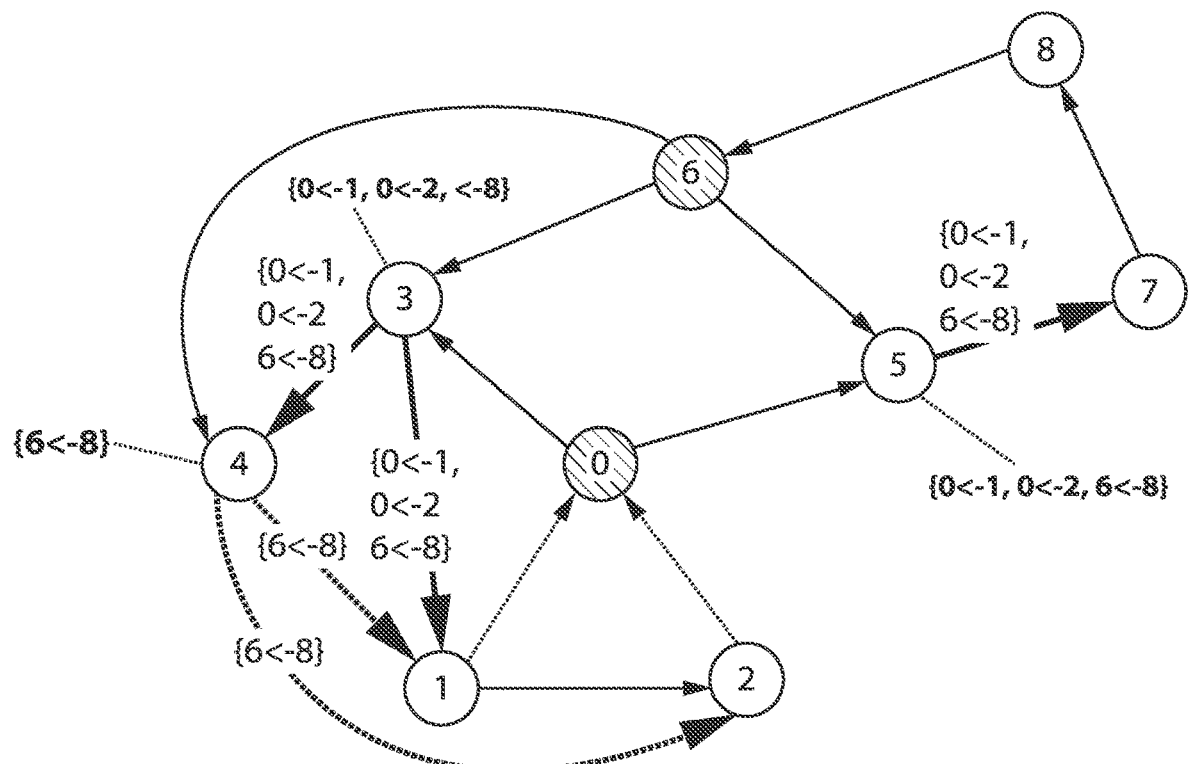
FIG. 6 is the exemplary directed graph of FIG. 5 where a sixth iteration takes place to detect the IDs, in accordance with an embodiment of the present invention.

FIG. 6 is the exemplary directed graph of FIG. 5 where a sixth iteration takes place to detect the IDs, in accordance with an embodiment of the present invention.

By employing the DFS-approach, there are 5 messages with 22 IDs that are sent by vertices 0 and 6.

In particular, the edge {6<-8} is sent through edges from vertex 3 to 1, from 3 to 4, from 4 to 1, from 4 to 2, and from 5 to 7.

The two edges {0<-1, 0<-2} are sent through edges from vertex 3 to 1, from 3 to 4, and from 5 to 7.

Therefore, the sixth iteration includes 5 messages with 22 IDs.

Figure 7:
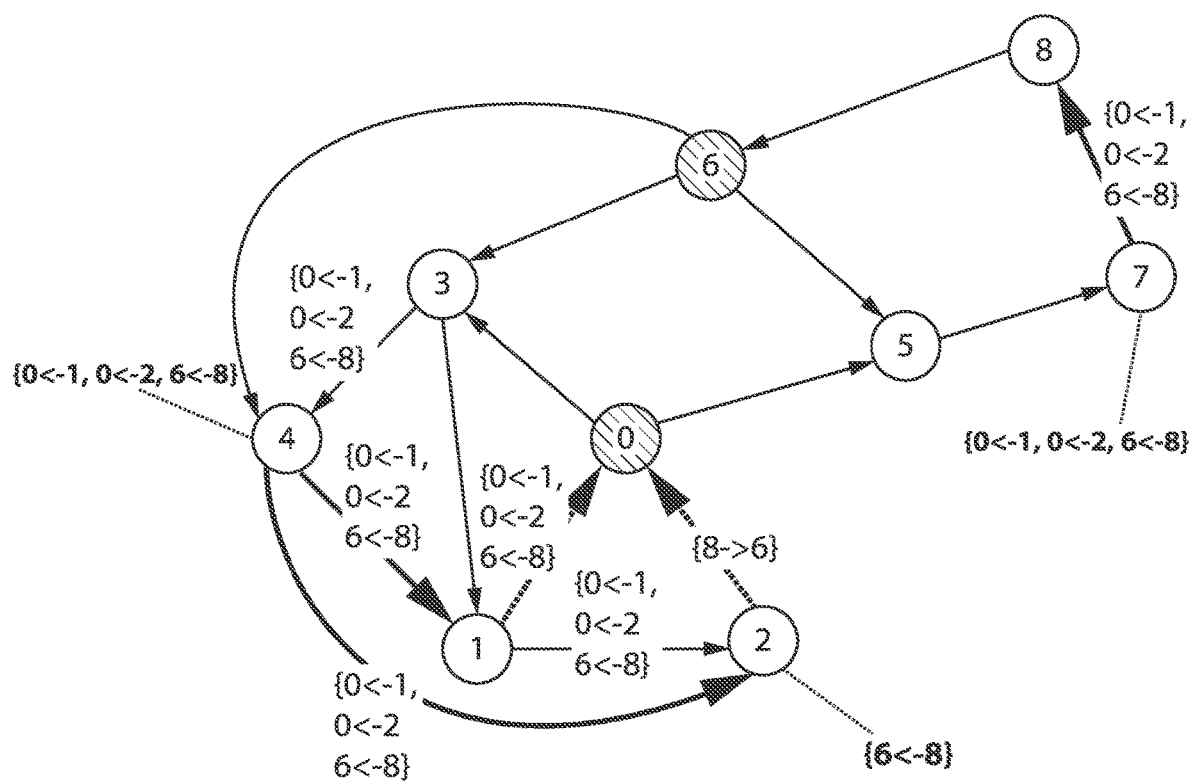
FIG. 7 is the exemplary directed graph of FIG. 6 where a seventh iteration takes place to detect the IDs, in accordance with an embodiment of the present invention.

FIG. 7 is the exemplary directed graph of FIG. 6 where a seventh iteration takes place to detect the IDs, in accordance with an embodiment of the present invention.

By employing the DFS-approach, there are 6 messages with 32 IDs that are sent by vertices 0 and 6.

In particular, the edge {6<-8} is sent through edges from vertex 1 to 0, from 1 to 2, from 2 to 0, from 4 to 1, from 4 to 2, and from 7 to 8.

The two edges {0<-1, 0<-2} are sent through edges from vertex 1 to 0, from 1 to 2, from 4 to 1, from 4 to 2, and from 7 to 8.

Therefore, the seventh iteration includes 6 messages or 32 IDs.

After the 7th iteration, received vertices can identify next one edges in cycles if they are sources of received edges. Vertex 1 identifies a path from 4 to 1 to 0 (0<-1<-4) since vertex 1 received { 0<-1} from vertex 4, vertex 2 identifies two paths from 1 to 2 to 0 (0<-2<-1) and from 4 to 2 to 0 (0<-2<-4) since vertex 2 received {0<-2} from vertices 1 and 4, and vertex 8 identifies a path from 7 to 8 to 6 (6<-8<-7) since vertex 8 received { 6<-8} from vertex 7.

Once new edges in cycles are detected, they are informed by sending new paths to targeted vertices.

Figure 8:
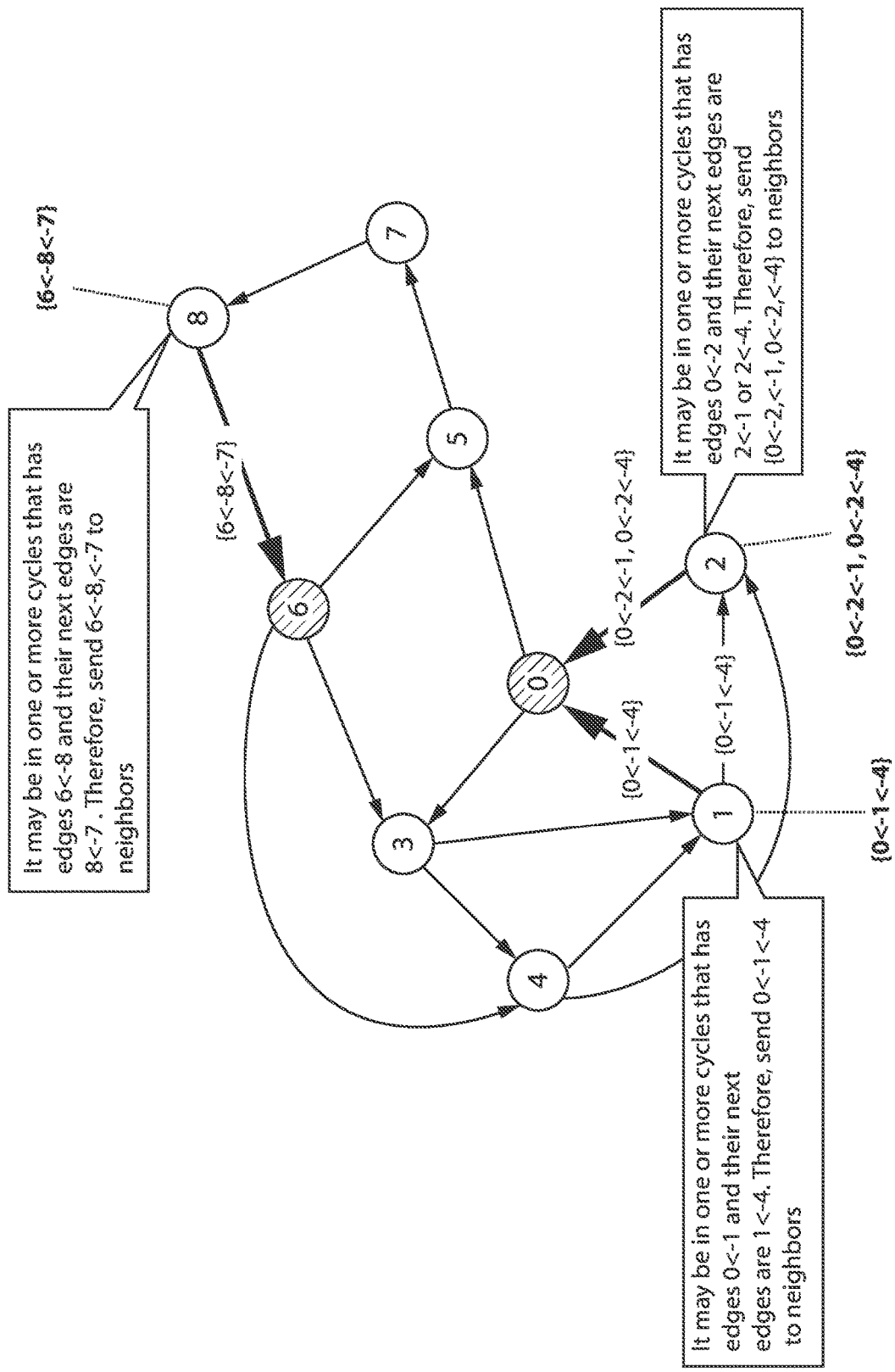
FIG. 8 is the exemplary directed graph of FIG. 7 where an eighth iteration takes place to detect the IDs, in accordance with an embodiment of the present invention.

FIG. 8 is the exemplary directed graph of FIG. 7 where an eighth iteration takes place to detect the IDs, in accordance with an embodiment of the present invention.

By employing the DFS-approach, there are 4 messages with 15 IDs.

In particular, the path {0<-1<-4} is sent through edges from vertex 1 to 0 and from 1 to 2.

The two paths { 0<-2<-1, 0<-2<-4} are sent through edges from vertex 2 to 0.

The path {6<-8<-7} is sent through an edge from vertex 8 to 6.

Therefore, the eighth iteration also includes 4 messages or 15 IDs.

It is noted that vertex 2 ignores the received path {0<-1<-4} since the first ID in the path is not vertex 2. On the other hand, vertex 0 and 6 does not ignore received paths since their first vertices are vertex 0 and 6, respectively.

It is also noticed that targeted vertices 0 and 6 identified candidates of two edges in cycles here and redirect received paths ({0<-1<-4, 0<-2<-1, 0<-2<-4}, {6<-8<-7}, respectively) to all the neighbor vertices to identify candidates of third edges with the next iterations.

Figure 9:
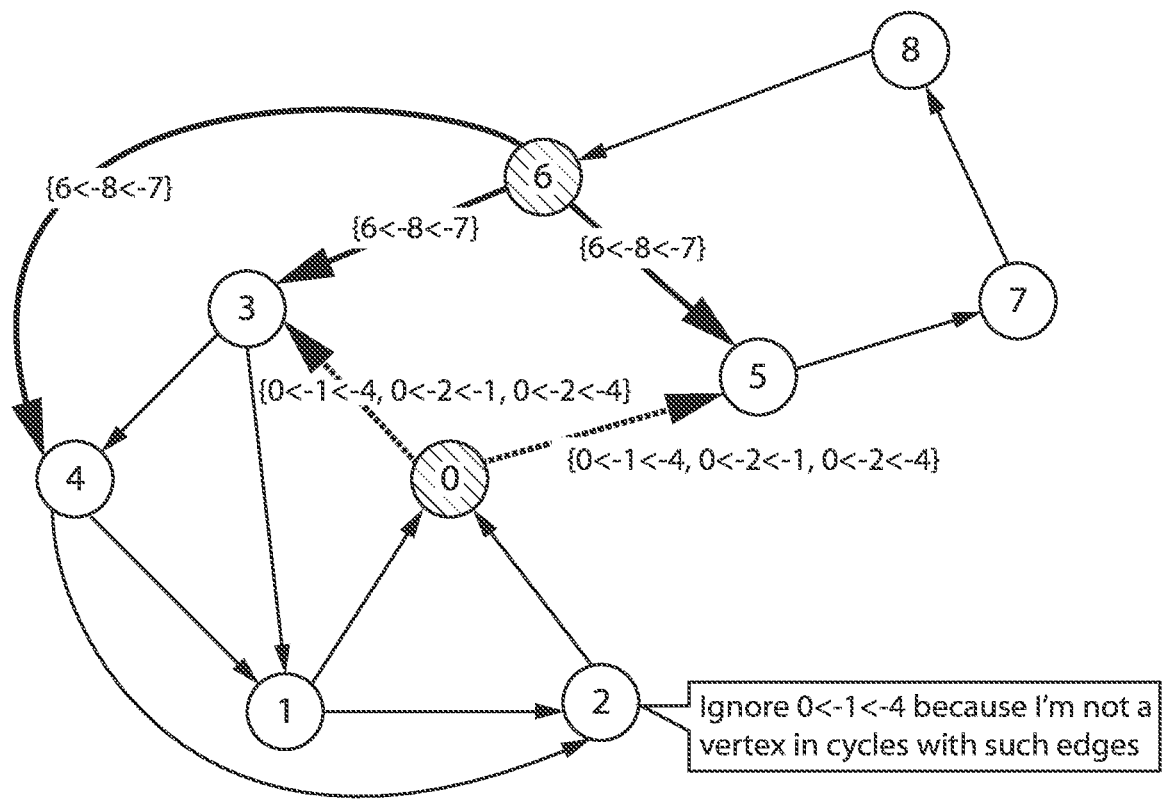
FIG. 9 is the exemplary directed graph of FIG. 8 where a ninth iteration takes place to detect the IDs, in accordance with an embodiment of the present invention.

FIG. 9 is the exemplary directed graph of FIG. 8 where a ninth iteration takes place to detect the IDs, in accordance with an embodiment of the present invention.

By employing the DFS-approach, there are 5 messages or 24 IDs that are sent by vertices 0 and 6.

In particular, the path {6<-8<-7} is sent through edges from vertex 6 to 3, from 6 to 4, and from 6 to 5.

The paths {0<-1<-4, 0<-2<-1, 0<-2<-4} are sent through edges from vertex 0 to 3 and from 0 to 5.

Therefore, the ninth iteration includes 5 messages or 27 IDs.

Figure 10:
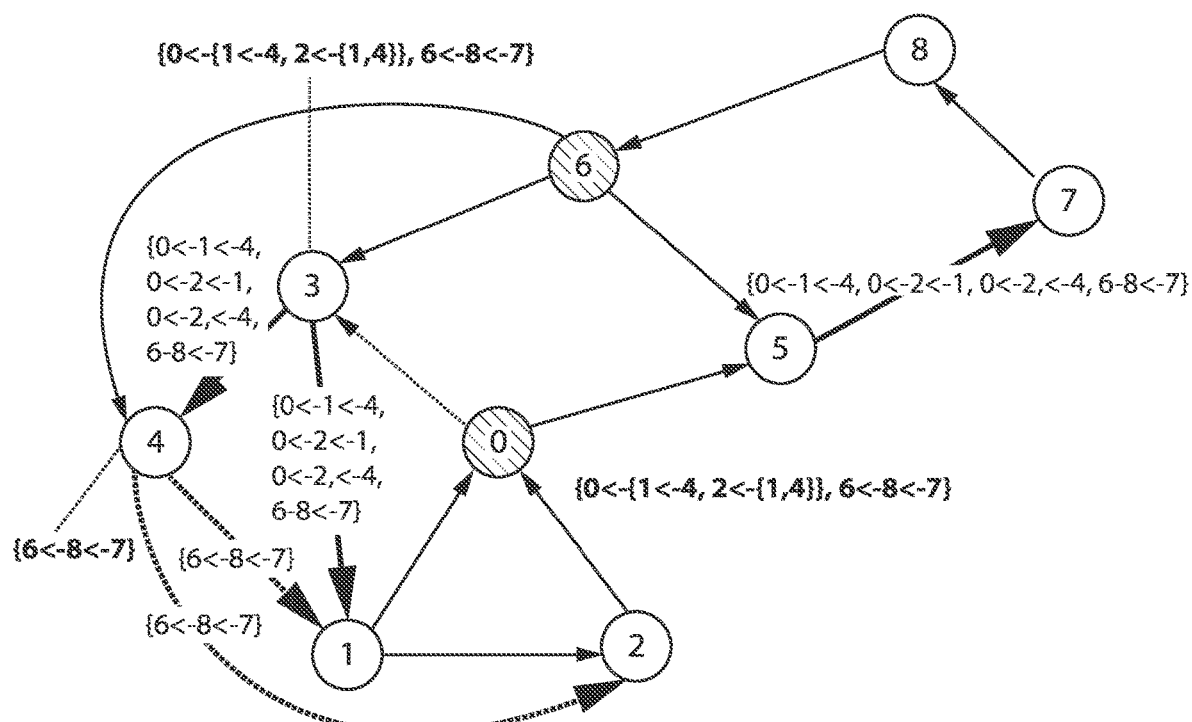
FIG. 10 is the exemplary directed graph of FIG. 9 where a tenth iteration takes place to detect the IDs, in accordance with an embodiment of the present invention.

FIG. 10 is the exemplary directed graph of FIG. 9 where a tenth iteration takes place to detect the IDs, in accordance with an embodiment of the present invention.

By employing the DFS-approach, there are 5 messages or 42 IDs.

In particular, the path {6<-8<-7} is sent through edges from vertex 3 to 1, from 3 to 4, from 4 to 1, 4 to 2, and from 5 to 7.

The paths {0<-1<-4, 0<-2<-1, 0<-2<-4} are sent through edges from vertex 3 to 1, from 3 to 4, and from 5 to 7.

Therefore, the tenth iteration includes 5 messages or 42 IDs.

After the $10^{th}$ iteration, received vertices can identify next one edges in cycles if they are last IDs in received edges. Vertex 1 identifies an edge from 3 to 1 since it receives {0<-2<-1}, vertex 4 identifies an edge from 3 to 4 since it receives {0<-1<-4, 0<-2<-4} and vertex 7 identifies an edge from 5 to 7 since it receives {6<-8<-7}.

Figure 11:
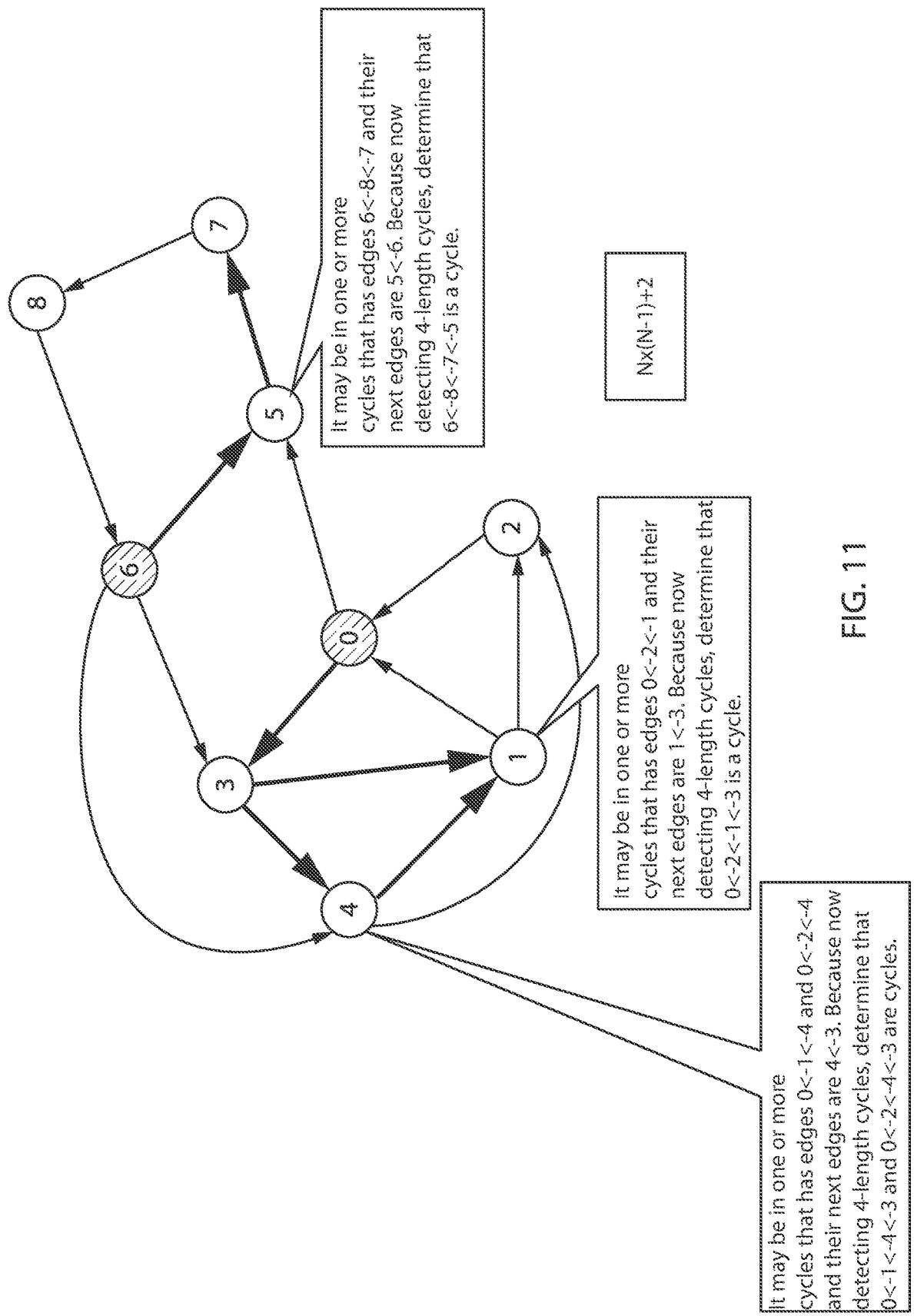
FIG. 11 is the exemplary directed graph of FIG. 10 where an eleventh iteration takes place to detect the IDs, in accordance with an embodiment of the present invention.

FIG. 11 is the exemplary directed graph of FIG. 10 after a 10th iteration takes place to detect the IDs, in accordance with an embodiment of the present invention. Since vertex 1 knew the edge from vertex 3 to 1, it follows the path 0<-2<-1, and a path 0<-2<-1<-3 in a cycle is identified. Because a 4-length cycle is now being detected, the vertex 1 can know that there is an edge from 0 to 3 and 0<-2<-1<-3 is a cycle. Similarly, since vertex 4 knew the edge from vertex 3 to 4, it follows the paths 0<-1<-4 and 0<-2<-4, and two cycles 0<-1<-4<-3, 0<-2<-4<-3 are identified. Since vertex 5 knew the edge from vertex 6 to 5, it follows the path 6<-8<-7, and a cycle 6<-8<-7<-5 is identified.

Therefore, with reference to FIGS. 1-11, the Pregel model is a distributed programming framework, focused on providing users with a natural API for programming graph algorithms while managing the details of distribution invisibly, including messaging and fault tolerance. The Pregel model is similar in concept to MapReduce, but with a natural graph API and much more efficient support for iterative computations over the graph. This graph focus also distinguishes it from other frameworks that hide distribution details. Pregel is also different because it implements a stateful model where long-lived processes compute, communicate, and modify local state, rather than a dataflow model where any process computes solely on input data and produces output data input by other processes. Pregel was inspired by the Bulk Synchronous Parallel model, which provides its synchronous superstep model of computation and communication. However, the BFS approach has been employed in the Pregel model. The exemplary embodiments of the present invention, instead, employ the DFS approach to the Pregel model. In the exemplary embodiments, with k iterations, candidates of edges in cycles are identified by only redirecting received IDs. With k−1 iterations, candidates of next edges of the identified edges in cycles are identified by only redirecting received IDs and then with the ith iteration, the identified edges are informed to the target vertices.

Figure 12:
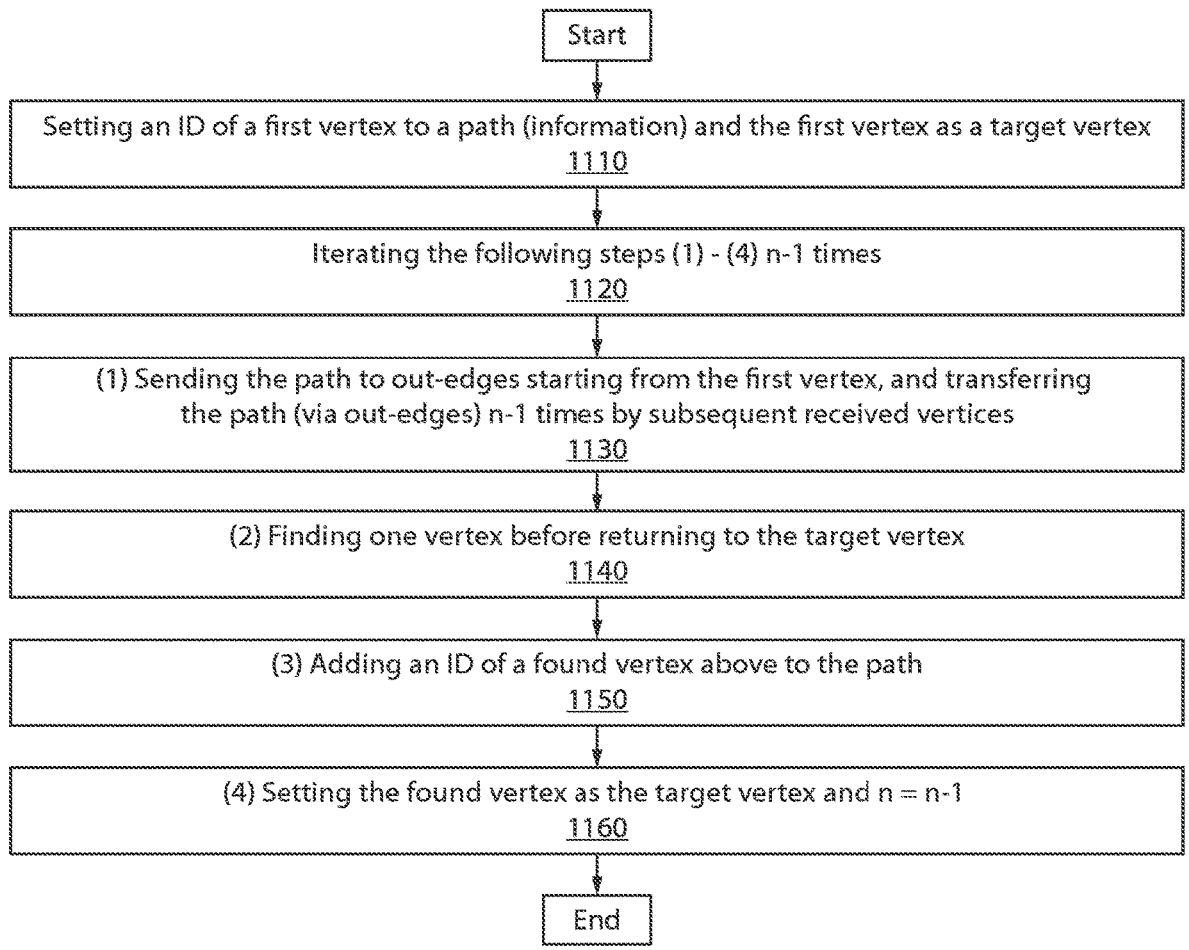
FIG. 12 is a block/flow diagram of an exemplary method for applying depth first search (DFS)-based cycle detection on the Pregel model, in accordance with an embodiment of the present invention.

FIG. 12 is a block/flow diagram of an exemplary method for applying depth first search (DFS)-based cycle detection on the Pregel model, in accordance with an embodiment of the present invention.

At block 1110, set an ID of a first vertex to a path (information) and the first vertex as a target vertex.

At block 1120, iterate the following steps n−1 times.

At block 1130, send the path to out-edges starting from the first vertex, and transferring the path (via out-edges) n−1 times by subsequent received vertices.

At block 1140, find one vertex before returning to the target vertex.

At block 1150, add an ID of a found vertex above to the path.

At block 1160, set the found vertex as the target vertex and n=n−1.

Figure 13:
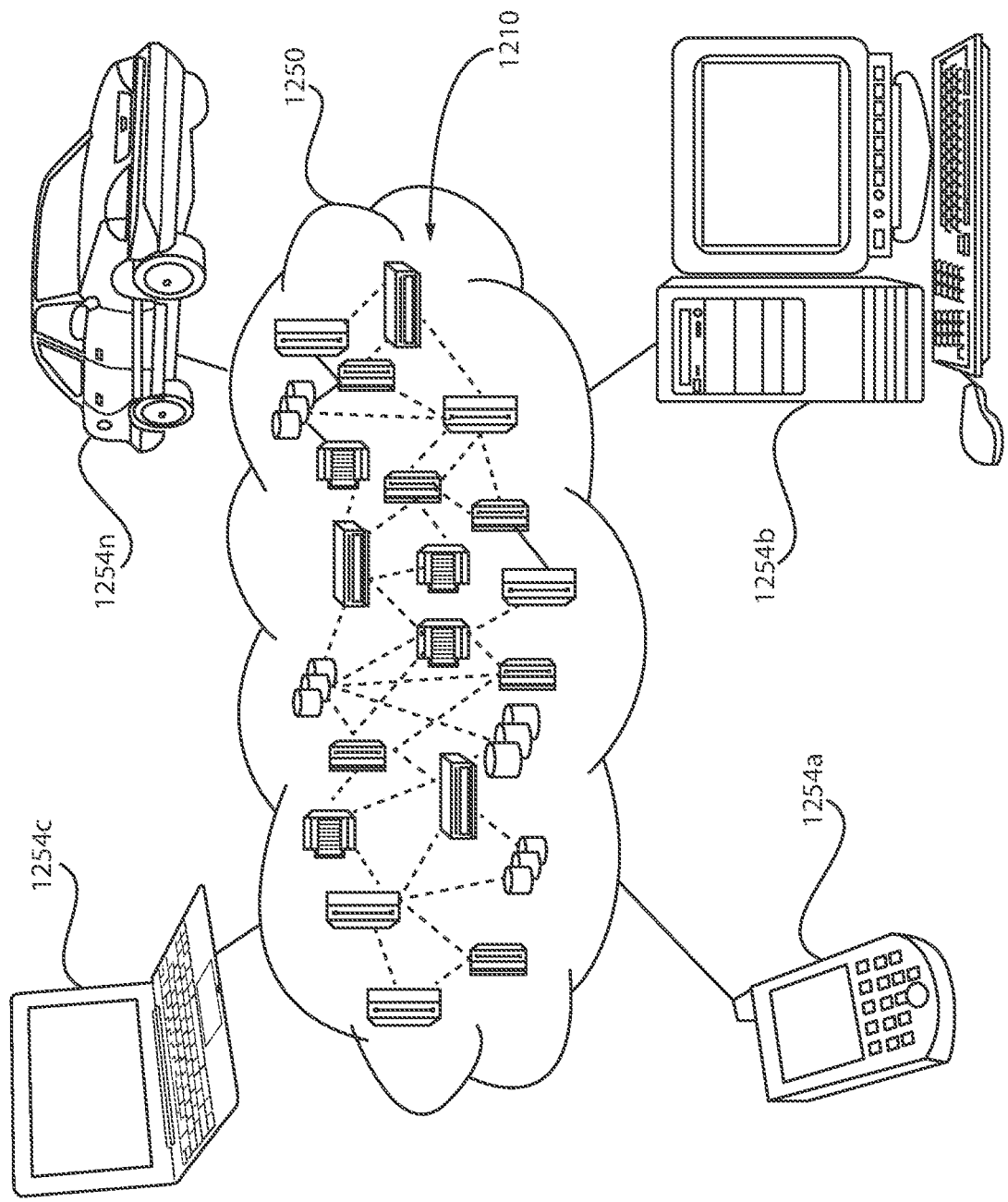
FIG. 13 is a block/flow diagram of an exemplary cloud computing environment, in accordance with an embodiment of the present invention.

FIG. 13 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 13, illustrative cloud computing environment 1250 is depicted for enabling use cases of the present invention. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N can communicate. Nodes 1210 can communicate with one another. They can be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 13 are intended to be illustrative only and that computing nodes 1210 and cloud computing environment 1250 can communicate with any type of computerized device over any type of network and/or network addressable connection (e.g., using a web browser).

Figure 14:
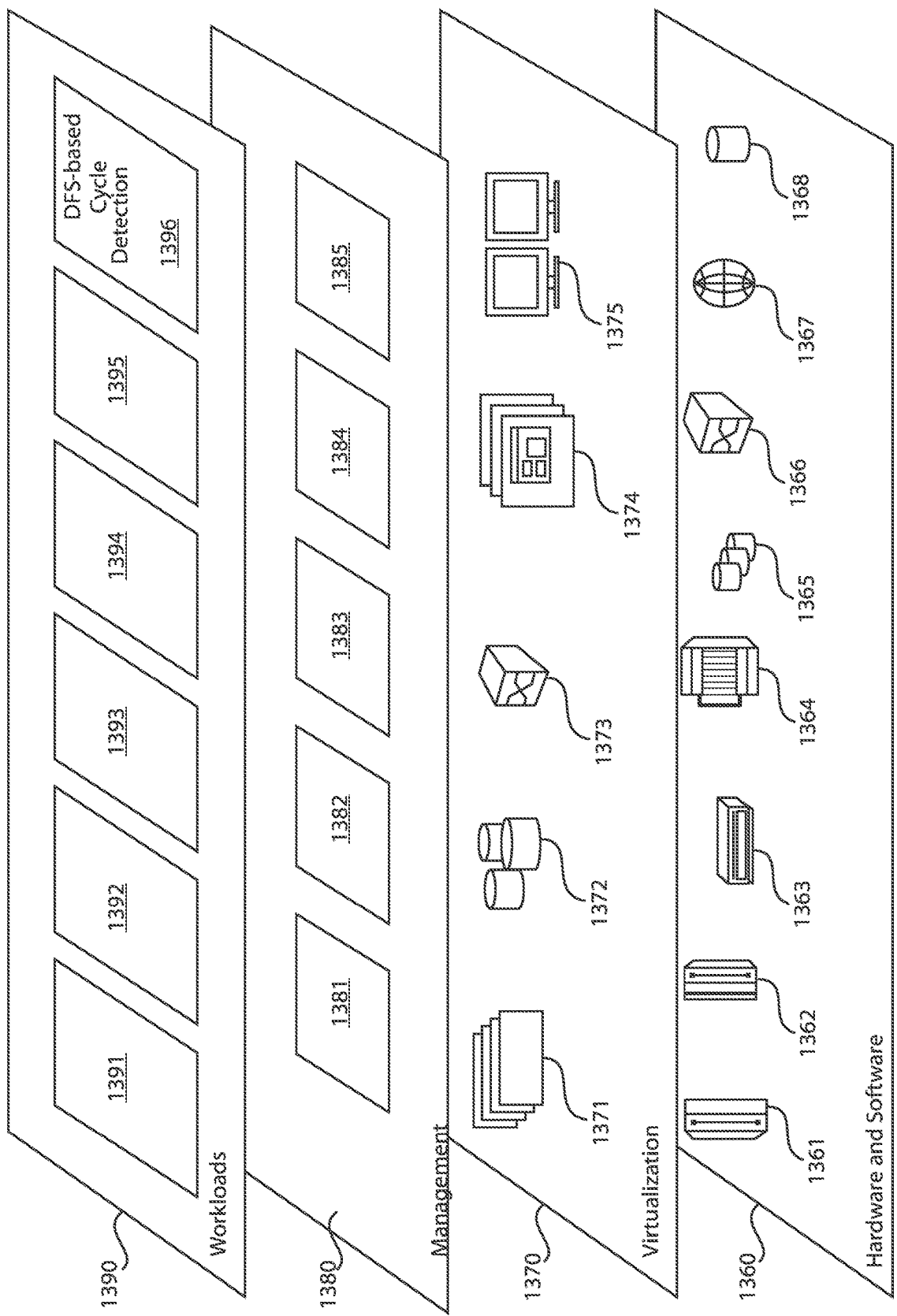
FIG. 14 is a schematic diagram of exemplary abstraction model layers, in accordance with an embodiment of the present invention.

FIG. 14 is a schematic diagram of exemplary abstraction model layers, in accordance with an embodiment of the present invention. It should be understood in advance that the components, layers, and functions shown in FIG. 14 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities can be provided: virtual servers 1371; virtual storage 1372; virtual networks 1373, including virtual private networks; virtual applications and operating systems 1374; and virtual clients 1375.

In one example, management layer 1380 can provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment can be utilized. Examples of workloads and functions which can be provided from this layer include: mapping and navigation 1391; software development and lifecycle management 1392; virtual classroom education delivery 1393; data analytics processing 1394; transaction processing 1395; and DFS-based cycle detection 1396 in cloud servers.

Figure 15:
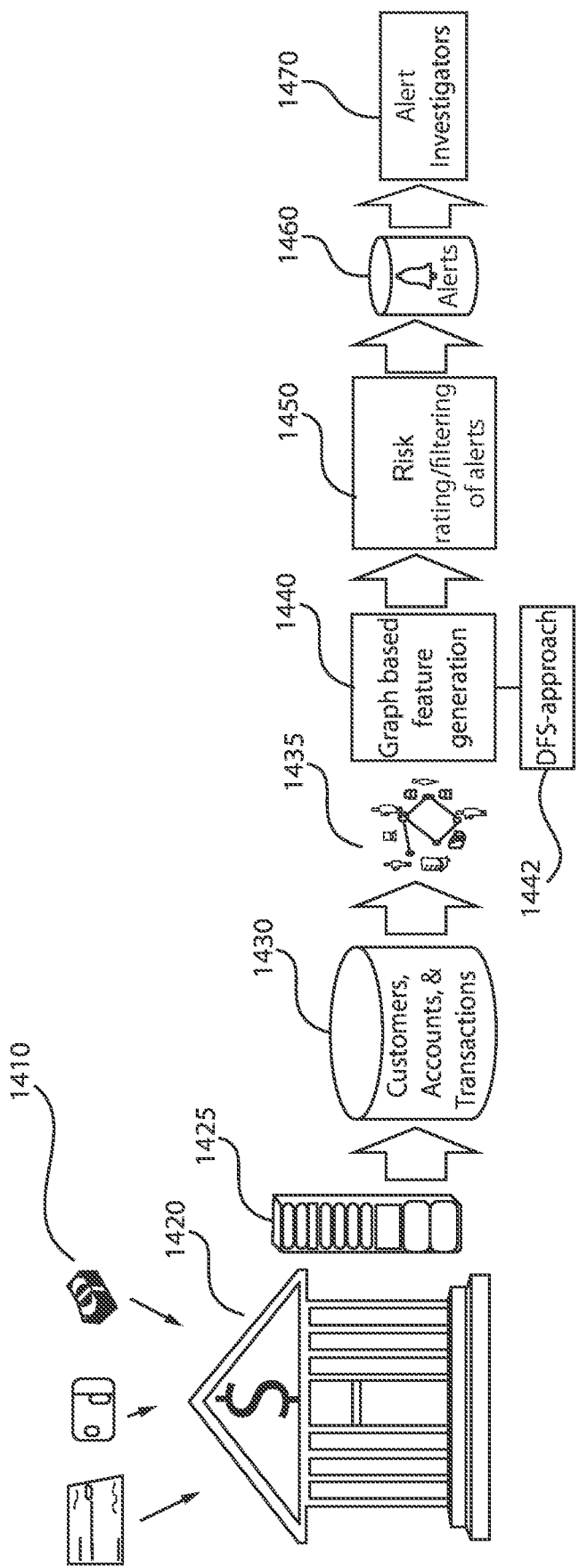
FIG. 15 is a block/flow diagram of a practical application for applying depth first search (DFS)-based cycle detection on the Pregel model, in accordance with an embodiment of the present invention.

FIG. 15 is a block/flow diagram of a practical application for applying depth first search (DFS)-based cycle detection on the Pregel model, in accordance with an embodiment of the present invention.

Financial crime (e.g., fraud, theft, money laundering) is a large and growing problem, in some way touching almost every financial institution, as well as many individuals, and in some cases, entire societies. Financial institutions are the front line in the war against financial crime and accordingly, must devote substantial human and technology resources to this effort. Current processes to detect financial misconduct (including the technologies used) have limitations in their ability to effectively differentiate between malicious behavior and ordinary financial activity. These limitations tend to result in gross over-reporting of suspicious activity (usually manifested as "alerts") that necessitate time-intensive and costly manual review.

However, the DFS-based approach for cycle detection of the present invention can aid in better detecting, e.g., financial crimes. Thus, at least one practical application for the present invention relates to detecting fraud, and especially, as it relates to the banking system.

Referring back to FIG. 15, a bank 1420 processes financial transactions 1410. One or more servers 1425 can be used to process such financial transactions 1410 by accessing various databases 1430 including customer information/data. The exemplary embodiments can be employed to generate a graph 1435 including a plurality of nodes and a plurality of edges connecting the nodes. Graph-based feature generation 1440 can thus be accomplished by a DFS-approach 1442, as described above. The graph-based feature generation 1440 results in risk ratings and filtering of alerts, as shown in 1450. Accurate alerts 1460 can thus be generated based on the use of the DFS-approach 1442. Such alerts 140 can be analyzed by investigators 1470.

Therefore, financial crime is a broad and growing class of criminal activity involving the misuse, misappropriation, or misrepresentation of entities with monetary value. Common subclasses of financial crime include theft, fraud, and money laundering (i.e., obscuring the true origin of monetary entities to evade regulations or avoid taxes). The monetary value of such crimes can range from tens of dollars to tens of billions of dollars, however, the overall negative consequences of such crimes extend far beyond their monetary value. In fact, the consequences may even be societal in scope.

Financial institutions have been exploring the use of machine learning techniques to augment existing transaction monitoring capabilities. Machine learning techniques offer a promising capability to identify suspicious activity from an incoming stream of transactions, as well as to filter the false positives from the alerts generated by current technology, thereby making existing processes more efficient and ultimately more effective. These machine learning techniques rely on a set of features generated from knowledge about the transacting parties, from individual and aggregate transaction metrics, and from the topology of party-to-party relationships derived from static knowledge and transactional history. Topological features can be computed according to the DFS-based approach to cycle detection advanced by the exemplary embodiments of the present invention. For example, the exemplary embodiments of the present invention generate a graph from money transfers (e.g., account=node, transfer=edge). If there are (temporal) cycles, scores of accounts in cycles become high. With other scores, such as number of transfers, amount of balances, etc., machine-learning informs alerts to operators or investigators.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of systems and methods for depth first search (DFS)-based cycle detection on the Pregel model (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for reducing memory consumption, the computer-implemented method comprising:
generating a graph including a plurality of vertices and edges connecting the plurality of vertices;
applying a Pregel model to the graph;
commencing a cycle from a first vertex of the plurality of vertices;
setting an identification (ID) of the first vertex to a path and the first vertex as a target vertex; and
iterating the following n−1 times by employing the Pregel model having synchronicity with a depth first approach (DFS):
send the path to any vertices on out-edges using Pregel model messages, starting from the first vertex and transferring the path, via out-edges, n−1 times by subsequent received vertices;
find one vertex before returning to the target vertex;
add an ID of a found vertex to the path; and
set the found vertex as the target vertex such that n=n−1, where n is the number of Iterations,
wherein, with k iterations, candidates of the last edges in cycles are identified by redirecting received IDs and received vertices identify next one edges in cycles if they are sources of received edges.

2. The computer-implemented method of claim 1, wherein the Pregel model is a programming model implementing bulk synchronous parallelism for graph analytics.

3. The computer-implemented method of claim 1, wherein, once new edges in cycles are detected, they are informed by sending new paths to targeted vertices.

4. The computer-implemented method of claim 1, wherein, with the kth iteration, the identified edges are informed to target vertices.

5. The computer-implemented method of claim 1, wherein an output of the Pregel model is a set of values output by the plurality of vertices.

6. A computer-implemented method for reducing memory consumption in cycle detection processes, the computer-implemented method comprising: employing a depth first search (DFS) approach to detect an n-length cycle on a Pregel model by: generating a graph including a plurality of vertices and edges connecting the plurality of vertices; applying the Pregel model to the graph; commencing a cycle from a first vertex of the plurality of vertices; setting an identification (ID) of the first vertex to a path and the first vertex as a target vertex; and iterating a DFS process n−1 times with a depth first approach (DFS), using Pregel model messages to send the path information between vertices where n is the number of iterations, wherein, with k iterations, candidates of the last edges in cycles are identified by redirecting received IDs and received vertices identify next one edges in cycles if they are sources of received edges.

7. The computer-implemented method of claim 6, wherein the DFS process includes sending the path to out-edges starting from the first vertex and transferring the path, via out-edges, n−1 times by subsequent received vertices.

8. The computer-implemented method of claim 7, wherein the DFS process further includes finding one vertex before returning to the target vertex.

9. The computer-implemented method of claim 8, wherein the DFS process further includes adding an ID of a found vertex to the path.

10. The computer-implemented method of claim 9, wherein the DFS process further includes setting the found vertex as the target vertex such that n=n−1.

11. The computer-implemented method of claim 6, wherein the Pregel model is a programming model implementing bulk synchronous parallelism for graph analytics.

12. The computer-implemented method of claim 6, wherein, once new edges in cycles are detected, they are informed by sending new paths to targeted vertices.

13. The computer-implemented method of claim 6, wherein, with the kth iteration, the identified edges are informed to target vertices.

14. The computer-implemented method of claim 6, wherein an output of the Pregel model is a set of values output by the plurality of vertices.

15. A computer program product for reducing memory consumption, the computer program product comprising a computer readable storage medium having program instructions embodied therewith, the program instructions executable by a computer to cause the computer to:
generate a graph including a plurality of vertices and edges connecting the plurality of vertices;
apply a Pregel model to the graph;
commence a cycle from a first vertex of the plurality of vertices;
set an identification (ID) of the first vertex to a path and the first vertex as a target vertex; and
iterate the following n−1 times by employing the Pregel model having synchronicity with a depth first approach (DFS):
send the path to any vertices on out-edges using Pregel model messages, starting from the first vertex and transferring the path, via out-edges, n−1 times by subsequent received vertices;
find one vertex before returning to the target vertex;
add an ID of a found vertex to the path; and
set the found vertex as the target vertex such that n=n−1, where n is the number of iterations,
wherein, with k iterations, candidates of the last edges in cycles are identified by redirecting received IDs and received vertices identify next one edges in cycles if they are sources of received edges.

16. The computer program product of claim 15, wherein, once new edges in cycles are detected, they are informed by sending new paths to targeted vertices.

17. The computer program product of claim 15, wherein, with the kth iteration, the identified edges are informed to target vertices.

18. The computer program product of claim 15, wherein the Pregel model is a programming model implementing bulk synchronous parallelism for graph analytics.

19. The computer program product of claim 15, wherein an output of the Pregel model is a set of values output by the plurality of vertices.

20. The computer program product of claim 15, wherein, to avoid duplication of detected cycles, a higher ID is prevented from being redirected in a target vertex.

* * * * *